E. H. RYON.
VALVE MECHANISM FOR GAS ENGINES.
APPLICATION FILED AUG. 18, 1919.

1,422,138.

Patented July 11, 1922.
2 SHEETS—SHEET 1.

Inventor
Eppa H. Ryon

Southgate & Southgate
Attorneys

E. H. RYON.
VALVE MECHANISM FOR GAS ENGINES.
APPLICATION FILED AUG. 18, 1919.
1,422,138.
Patented July 11, 1922.
2 SHEETS—SHEET 2.
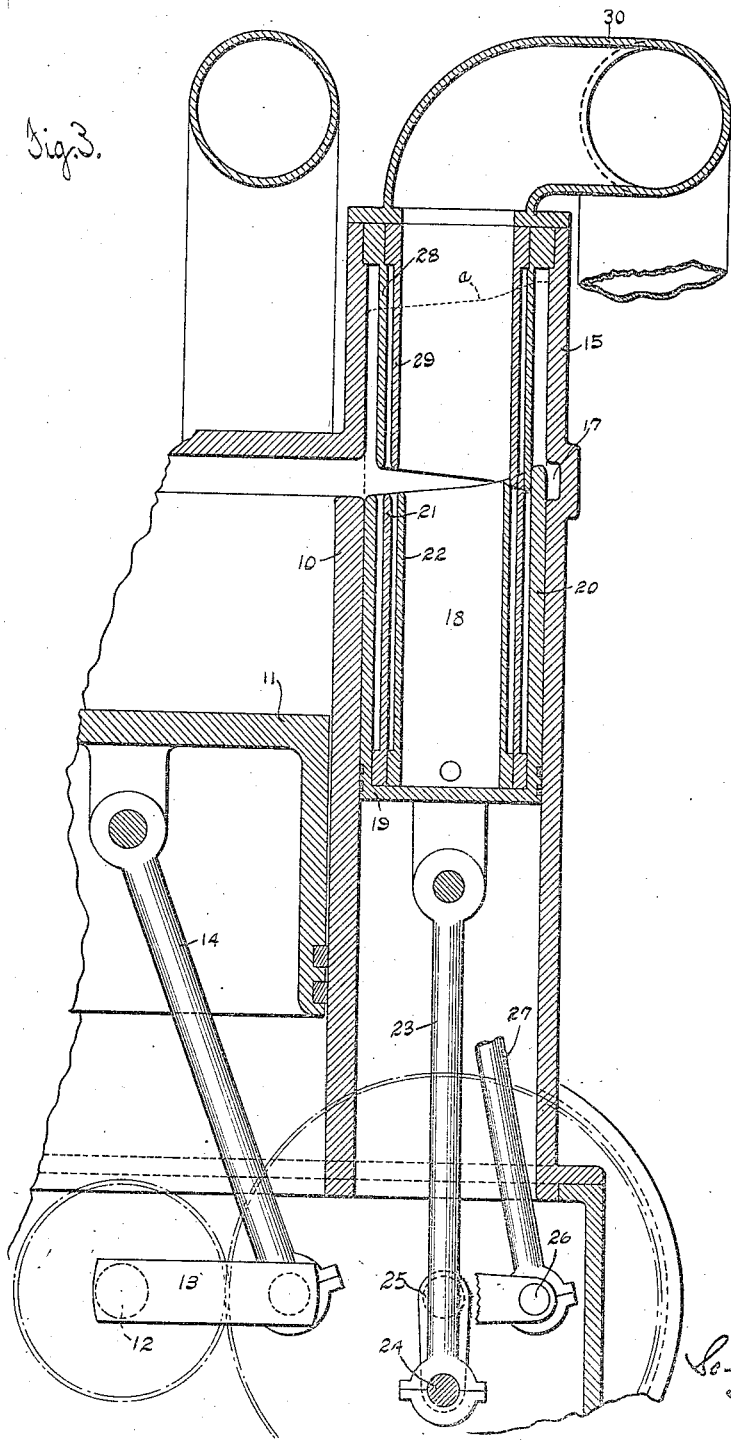

UNITED STATES PATENT OFFICE.

EPPA H. RYON, OF WALTHAM, MASSACHUSETTS.

VALVE MECHANISM FOR GAS ENGINES.

1,422,138.  Specification of Letters Patent.  Patented July 11, 1922.

Application filed August 18, 1919. Serial No. 318,076.

*To all whom it may concern:*

Be it known that I, EPPA H. RYON, a citizen of the United States, residing at Waltham, in the county of Middlesex and State of Massachusetts, have invented a new and useful Valve Mechanism for Gas Engines, of which the following is a specification.

This invention relates to a valve mechanism particularly designed for use in gas engines, but also capable of more general application.

It is an object of my invention to provide a valve mechanism in which the valves are positively operated in exact timed relation to the movement of the engine piston. In the preferred form, the valves are operated by a simple crank motion, thus avoiding abrupt changes in motion, and securing easy and silent operation.

Another object of my invention is to provide a valve structure, having a relatively large port opening and particularly adapted for rapid opening and closing movements.

A further feature of my invention relates to the provision of a construction by which packing is largely eliminated and leakage avoided.

My invention further relates to certain arrangements and combinations of parts hereinafter described and more particularly pointed out in the appended claims.

A preferred form of my invention is shown in the drawings, in which—

Fig. 3 is a transverse sectional elevation taken along the line 3—3 in Fig. 1.

Figure 1:
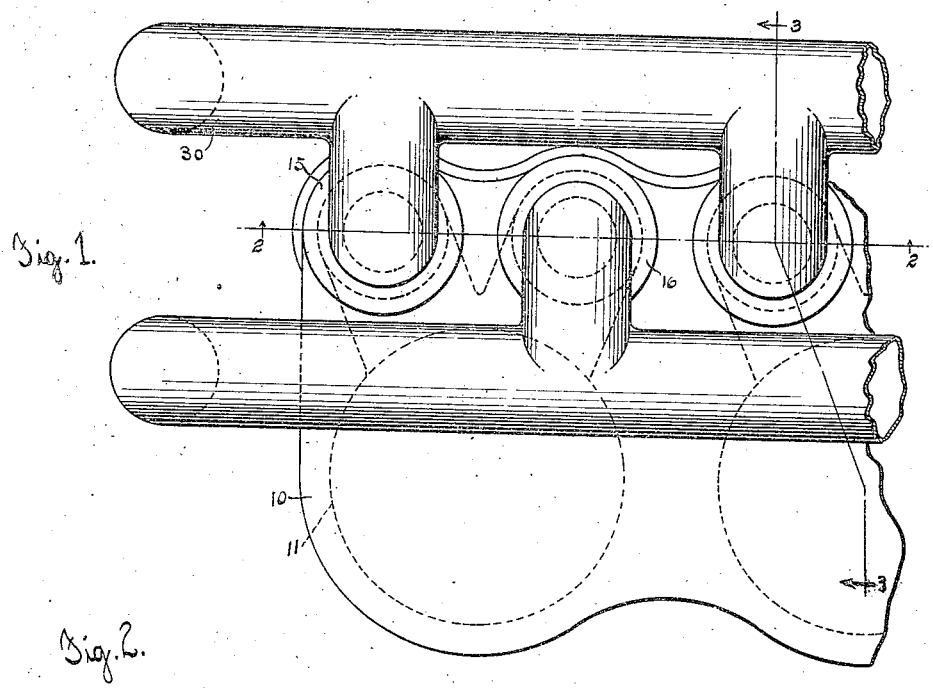
Fig. 1 is a plan view of a portion of a gas engine embodying my invention.

Referring to the drawings, I have shown a portion of a gas engine, having a cylinder 10, piston 11, engine shaft 12, crank 13, and connecting rod 14, all of the usual construction. The clearance space of the cylinder 10 is connected to a pair of cylindrical casings 15 and 16, disposed at the side of the cylinder and also extending above the cylinder head. Each casing 15 and 16 is provided with an annular recess 17 opening into the clearance space of the cylinder 10.

In Fig. 3, I have shown in section the parts of the intake valve, including a valve piston 18 slidable in the casing 15, the piston having a closed head 19 at its lower end and an upwardly extending cylindrical wall 20.

Figure 2:
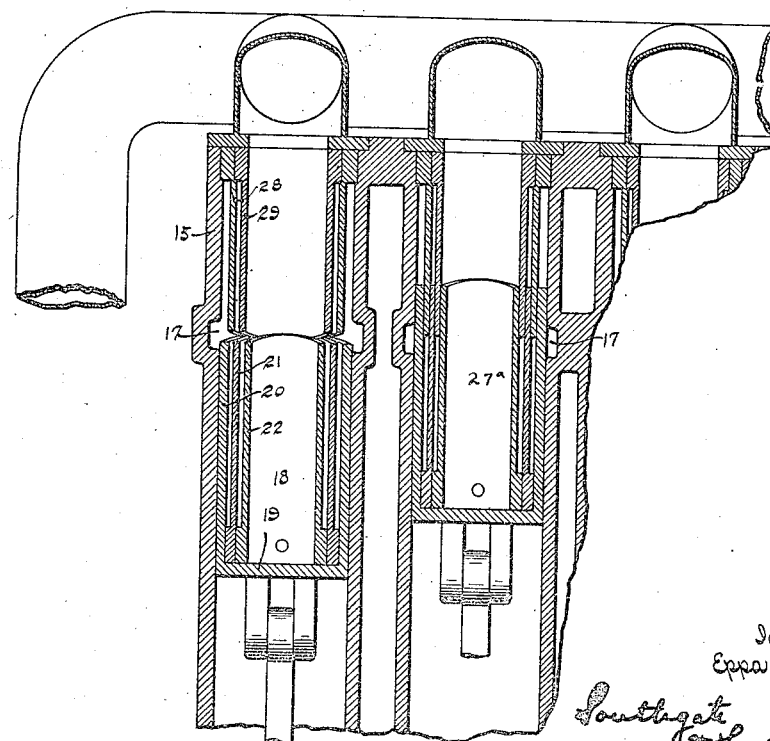
Fig. 2 is a longitudinal sectional elevation taken along the line 2—2 in Fig. 1.

A plurality of concentric sleeves 21 and 22 are mounted in the piston 18, their upper ends being spaced apart and their lower ends being rigidly secured in the piston 18. The piston is connected by a rod 23 to a crank 24 on the crank shaft 25 which is positively driven at one half of the speed of the engine shaft 12, preferably by "1 to 2" reduction gearing. A second crank 26 and rod 27 operate a corresponding exhaust valve 27ª (Fig. 2.)

The upper part of the cylindrical casing 15 is also provided with a plurality of concentric sleeves 28 and 29 extending downward from the upper end of the casing and spaced from each other and from the casing 15. When the piston 18 is in raised position, the piston wall 20 and sleeves 21, 22, 28, and 29 are alternately disposed and overlap a substantial distance, thus effectively preventing the passage of gas from the intake manifold 30 to the cylinder 10. No gas can pass from the manifold to the cylinder when the piston 18 is raised except by passing between the closely adjacent surfaces of each pair of the concentric fixed and movable elements of the valve structure. As these elements are in close contact, gas leakage is practically eliminated and does not depend on packing rings or oil film on the valve parts.

The upper ends of the wall 20 and sleeves 21 and 22 are beveled or otherwise cut away at one side and the lower ends of the sleeves 28 and 29 are similarly shaped. This furnishes an ample port opening when the parts are in the position shown in Fig. 3 while at the same time the sleeves always overlap at one edge, thus preventing any possible displacement thereof. The extreme upper position of the piston 18 is indicated by the doted line *a* in Fig. 3. The pistons 11 and 18 may, of course, be provided with the usual packing rings.

By properly selecting the positions of the cranks 24 and 26 with reference to the travel of the piston 11, the necessary opening and closing movements of both the intake and the exhaust valves may be directly and positively secured from the engine shaft 12.

While I have shown the adjacent ends of the fixed and movable sleeves as beveled to provide port openings, it will be evident that they may be cut away in any convenient outline so long as ample port opening is provided and a sufficient overlapping of parts is maintained to prevent displacement of the concentric members.

Having thus described my invention, it will be evident that other changes and modifications can be made therein by those skilled in the art without departing from the scope and spirit of my invention as set forth in the claims, and I do not wish to be otherwise limited to the details herein disclosed, but what I claim is:—

1. A valve mechanism for gas engines having a cylinder and piston, comprising a cylindrical casing, a plurality of co-operating fixed and movable concentric sleeves oppositely disposed within said casing, said sleeves being reversely beveled at their adjacent ends to form a port for the passage of gases when partially separated, and means to operate said movable sleeves in timed relation to said engine piston to open and close said port.

2. A valve mechanism for a gas engine having a cylinder and piston, comprising a fixed cylindrical sleeve, a plurality of movable sleeves alternating therewith, and means to reciprocate said movable sleeves to partially separate said fixed and movable sleeves at their adjacent ends in timed relation to the movement of the engine piston, said adjacent ends being shaped to provide a port opening when the sleeves are partially separated.

3. A valve mechanism for a gas engine having a cylinder and piston, comprising a fixed cylindrical sleeve beveled at its open end in one direction, a plurality of movable sleeves alternating therewith and beveled at their open ends in the opposite direction, and means to reciprocate said movable sleeves to partially separate said fixed and movable sleeves at their adjacent ends in timed relation to the movements of the engine piston, thereby permitting gases to pass through said valve.

4. A valve mechanism for a gas engine having a cylinder and piston, comprising a cylindrical casing, a cylindrical sleeve fixed at one end thereof, a valve piston open at one end and slidable in said casing, a concentric sleeve fixed in spaced relation within said piston, portions of said fixed and movable sleeves continuously over-lapping, and means to move said valve piston in timed relation to the movement of the engine piston to permit or prevent the passage of gas through said valve mechanism.

5. A valve mechanism for a gas engine having a cylinder and piston, comprising a cylindrical casing having a gas passage and also having an annular recess connected to said engine cylinder, a valve piston slidable in said cylindrical casing and having a head and a cylindrical wall extending from said head toward said recess, an additional valve sleeve mounted in said piston but spaced from the wall thereof, a fixed valve sleeve secured in spaced relation in one end of said casing and cooperating with said valve piston and movable valve sleeve, said fixed sleeve being connected to said gas passage, and means to reciprocate said valve piston in fixed relation to the movements of said engine piston to control the flow of gas between said recess and said passage.

6. A valve mechanism for a gas engine having a cylinder and piston, comprising a cylindrical casing with an annular recess spaced from one end thereof and connected to said engine cylinder, a valve piston slidable in said cylindrical casing and having a head and a cylindrical wall extending from said head toward said recess, an additional valve sleeve mounted in said piston but spaced from the wall thereof, fixed valve sleeves secured in spaced relation in one end of said casing and cooperating with said valve piston and movable valve sleeve, and means to reciprocate said valve piston in fixed relation to the movements of said engine piston, the open ends of said fixed and movable sleeves being partially cut away to form a port opening when said elements are partially separated.

7. A valve mechanism for a gas engine having a cylinder and piston, comprising fixed and movable concentric members having their adjacent end surfaces inclined to their axes, and means to reciprocate said movable member to partially separate the adjacent ends of said fixed and movable members in timed relation to the movement of the engine piston to permit gas to pass through the opening thus formed.

In testimony whereof I have hereunto affixed my signature.

EPPA H. RYON.